United States Patent Office 2,704,269
Patented Mar. 15, 1955

2,704,269

METHOD OF PREPARING SOLUTIONS OF GELATIN IN POLYHYDRIC ALCOHOLS

Linwood F. Tice, Salem, N. J., assignor to Gelatin Research Society of America, Inc., New York, N. Y., a corporation of New York No Drawing. Original applications May 30, 1949, Serial No. 91,233, now Patent No. 2,558,065, dated June 26, 1951, and November 24, 1950, Serial No. 197,507, now Patent No. 2,584,307, dated February 5, 1952. Divided and this application June 25, 1951, Serial No. 233,490

3 Claims. (Cl. 167—82)

This invention relates to the preparation of glycerinated gelatin and similar products and more particularly to certain novel methods of preparing solutions of gelatin in polyhydric alcohols.

This application is a division of my co-pending application Serial No. 197,507, now Patent No. 2,584,307, filed November 24, 1950, for Method of Preparing Solutions of Gelatin in Polyhydric Alcohols, and of Serial No. 91,233, now Patent No. 2,558,065, filed May 3, 1949, for Method of Preparing Solutions of Gelatin in Polyhydric Alcohols.

Conventional methods of preparing solutions of gelatin in polyhydric alcohols such as glycerin involve soaking the gelatin in water, allowing the gelatin to swell therein, subsequently adding glycerin, mixing the water swollen gelatin and the glycerin, heating the mixture until the gelatin dissolves in the mixture and, finally, heating the mixture at a temperature sufficient to vaporize the water and remove it from the mixture.

A method which is only satisfactory on a small scale and only if a relatively low concentration of gelatin is employed involves heating glycerin and water to approximately 100° C. and then slowly adding granulated gelatin in divided portions with stirring until the mixture becomes homogeneous. This procedure does not yield the desired result when the quantity of gelatin is in the range of 30–55% by weight of the resulting mixture.

The problem of dissolving large quantities of gelatin in polyhydric alcohols such as glycerin has always been a troublesome one, particularly when the quantity of gelatin to be dissolved is of the order of 30–55% of the mixture of glycerin and water. Under those conditions, the gelatin imbibes the solvent before all of the gelatin is wet. Stirring of the resulting material causes lumps of partially wetted gelatin to form and entrains air in the mixture. The application of heat to the lumpy, aerated mixture does not result in the desired clear, homogeneous solution. This problem has plagued the pharmaceutical industry for years.

Solutions of quantities of gelatin in the order of approximately 30–50% by weight in glycerin desirably possess the characteristics of a somewhat plastic solid at room temperature. The material dissolves in aqueous liquids and provides a suitable carrier for medicinal preparations in the treatment of numerous physical ailments. The product supplied commercially by conventional methods is often of very poor quality. So well known are the disadvantages of conventional methods that many pharmacists avoid the preparation of glycerinated gelatin whenever possible.

One of the objects of the present invention is to provide an improved method for the preparation of solutions of large amounts of gelatin in polyhydric alcohols.

Further objects will become apparent from the following description and examples.

According to the present invention, generally stated, granulated gelatin and a polyhydric alcohol such as glycerin or propylene glycol are thoroughly chilled, for example by cooling to a temperature in the range of —5° C. to 5° C. Quantities of the glycerin or propylene glycol are then poured over the surface of the gelatin in proportions to provide a 30–55% concentration by weight of gelatin in the resulting mixture. A vacuum is applied to the mixture to remove residual air in the granulated gelatin, for example, by placing the mixture in a vessel to which a vacuum is applied, or by providing air-evacuating means to the gelatin in a suitable vessel such as a tube. The vacuum is applied until the glycerin has wetted all of the grains of gelatin. The mixture of gelatin and glycerin is then heated at a temperature of approximately 80–100° C. until solution the gelatin in the glycerin is complete. Occasional slow agitation without aeration may be applied to the mixture during this period. Temperatures in excess of 100° C. tend to darken the product. The resulting solution is then cooled to room temperature whereupon it hardens to a viscous mass which can be cut into pieces for use. Medicaments can be embodied in the solution before it cools, or the cooled mass can be reheated to liquify it and the medicaments can then be incorporated. As an alternative, the drug can be dissolved in a small quantity of water and mixed with glycerin. The mixture is then chilled, added to chilled granulated gelatin and processed in the manner described hereinabove to yield a clear, homogeneous glycerinated gelatin product.

In an alternative procedure embodying the method of the present invention, the granulated gelatin is mixed with a primary aliphatic monohydric alcohol such as ethyl alcohol or isopropyl alcohol, the glycerin is added and mixed thoroughly with the other ingredients and the resulting mixture is then heated to approximately 80° C. until a clear, homogeneous solution is obtained. The monohydric alcohol is then removed by evaporation or distillation. This procedure results in a clear product, but it is difficult, if not impossible, to remove all of the alcohol from the solution, so firmly is it bound to the glycerin. The presence of the residual alcohol is not objectionable insofar as the properties and uses of the product are concerned. This alternative procedure constitutes another means of eliminating lumping of the gelatin and occlusion of air in the resulting product.

The following examples will serve to illustrate the improved methods of the present invention.

Example I

A 500 gram quantity of pure glycerin and a 500 gram quantity of granulated gelatin in stoppered bottles were chilled by means of storage in a refrigerator at approximately 0° C. for approximately four hours. The gelatin was then poured on the glycerin and the two then maintained at approximately 0° C. (within +5°), until the gelatin was below the surface of the glycerin. The mixture was then heated in an oven at a temperature ranging from 80–100° C. overnight. Upon cooling to room temperature, the solution solidified and became clear and homogeneous upon standing for several days.

Example II

The procedure of Example I was repeated, using 500 grams of propylene glycol in place of the glycerin. The results were the same as in the case of Example I. Both the glycerin and the propylene glycol behaved in exactly the same manner.

Example III

A 50 gram quantity of granulated gelatin was placed in a flask and a glass tube with cotton in the end was placed in the flask. A 50 gram quantity of glycerin was poured into the flask and simultaneously therewith a vacuum was applied to the open end of the glass tube until the glycerin had permeated the gelatin. The vacuum line was disconnected and the glass tube was withdrawn. The flask was placed at once in an oven and heated at 80° C. with occasional slow rotation until the solution was complete. Similar runs were made at temperatures below 80° C. but more time was required.

Example IV

A small wad of cotton was placed in the tip of a glass funnel and 50 grams of chilled granulated gelatin was packed in the funnel above the cotton. A vacuum line was applied to the stem of the funnel and simultaneously therewith, 50 grams of chilled glycerin was poured on the gelatin. When the gelatin became thoroughly wetted with the glycerin, the vacuum line was disconnected and the cotton wad was removed. The funnel was placed in the neck of a bottle and both were placed in an oven at 80–100° C. After several hours, the gelatin-glycerin mass liquified and ran into the bottle. The liquid was then poured into a mold and allowed to solidify at room temperature.

*Example V*

A mixture of 20 cc. of water and 25 grams of glycerin was prepared and chilled to approximately 0° C. (within +5°). The mixture was then added to 40 grams of chilled granulated gelatin in a flask equipped with a vacuum line as in Example III. Vacuum was applied at once to the flask and was maintained until the gelatin was thoroughly wetted. To the resulting mass was added 20 cc. of water and the mixture was placed on a water bath and heated at 80–100° C. for approximately three hours with occasional slow rotation of the flask. The resulting solution was then poured into molds and allowed to harden.

*Example VI*

A mixture of 100 grams of granulated gelatin in 60 cc. of ethyl alcohol was prepared. To this mixture was added 100 grams of glycerin. The resulting mixture was heated, the alcohol being removed by distillation until no further amounts of distillate were obtained. The residual solution was then allowed to solidify and was found to contain minor amounts of alcohol which did not interfere with the use of the product in pharmaceutical preparations.

*Example VII*

The procedure of Example VI was repeated using 100 grams of propylene glycol in place of the glycerin. The resulting product was similar in its properties as a pharmaceutical agent with that obtained in Example VI.

Other polyhydric alcohols may be employed in place of glycerin and propylene glycol in the improved method of the present invention, such as ethylene glycol. However, at present, the only polyhydric alcohols approved for pharmaceutical preparations are glycerin and propylene glycol. The novel process of the present invention is not limited to these polyhydric alcohols.

I claim:

1. An improved method of preparing solutions of gelatin in polyhydric alcohols comprising mixing granulated gelatin with a quantity of a primary lower aliphatic monohydric alcohol in the proportion of about 100 grams of gelatin to about 60 cc. of monohydric alcohol, adding to the resulting mixture a polyhydric alcohol, heating the resulting mixture at a temperature in the range of 80–100° C. until a clear, homogeneous solution is obtained, distilling off the primary aliphatic monohydric alcohol and subsequently cooling the residual liquid until a solid mass is obtained, said gelatin being present in said solid mass in an amount in the range of 30–55% by weight.

2. An improved method of preparing glycerinated gelatin comprising mixing granulated gelatin with a quantity of ethyl alcohol in the proportion of about 100 grams of gelatin to about 60 cc. of monohydric alcohol, adding to the resulting mixture glycerin, heating the resulting mixture at a temperature in the range of 80–100° C. until a clear, homogeneous solution is obtained, distilling off the ethyl alcohol and subsequently cooling the residual liquid until a solid mass is obtained, said gelatin being present in said solid mass in an amount in the range of 30–55% by weight.

3. An improved method of preparing a solution of gelatin in propylene glycol comprising mixing granulated gelatin with a quantity of ethyl alcohol in the proportion of about 100 grams of gelatin to about 60 cc. of monohydric alcohol, adding to the resulting mixture propylene glycol at a temperature in the range of 80–100° C. until a clear, homogeneous solution is obtained, distilling off the ethyl alcohol and subsequently cooling the residual liquid until a solid mass is obtained, said gelatin being present in said solid mass in an amount in the range of 30–55% by weight.

References Cited in the file of this patent

UNITED STATES PATENTS 2,461,478    Kaszuba _____ Feb. 8, 1949

FOREIGN PATENTS 439,784    Great Britain _____ Dec. 13, 1935